United States Patent
Gompper

(10) Patent No.: US 8,689,706 B2
(45) Date of Patent: Apr. 8, 2014

(54) LEG SOCKET

(71) Applicant: Brion Gompper, Lakewood, NJ (US)

(72) Inventor: Brion Gompper, Lakewood, NJ (US)

(73) Assignee: Component Hardware Group, Inc., Lakewood, NJ (US)

( * ) Notice: Subject to any disclaimer, the term of this patent is extended or adjusted under 35 U.S.C. 154(b) by 0 days.

(21) Appl. No.: 13/644,070

(22) Filed: Oct. 3, 2012

(65) Prior Publication Data

US 2013/0177352 A1 Jul. 11, 2013

Related U.S. Application Data

(60) Provisional application No. 61/626,971, filed on Oct. 6, 2011.

(51) Int. Cl.
*A47B 13/00* (2006.01)

(52) U.S. Cl.
USPC ..................... 108/158.11; 248/188

(58) Field of Classification Search
USPC ................. 108/156, 158.11, 155, 154, 157.1; 248/188.1, 188
See application file for complete search history.

(56) References Cited

U.S. PATENT DOCUMENTS

| | | | | |
|---|---|---|---|---|
| 240,668 | A * | 4/1881 | Curry | 108/156 |
| 2,168,810 | A * | 8/1939 | Sheldrick | 248/188.1 |
| 3,079,120 | A * | 2/1963 | Schwartz | 248/188 |
| 3,092,406 | A * | 6/1963 | Wasserstrom | 248/188 |
| 3,131,899 | A * | 5/1964 | Luhrs | 248/188 |
| 4,011,821 | A * | 3/1977 | Neal | 108/156 |
| 4,242,969 | A * | 1/1981 | Checkwood et al. | 108/158.11 |
| 5,230,491 | A * | 7/1993 | Tseng | 248/188.1 |
| 5,651,632 | A * | 7/1997 | Gordon | 403/319 |
| 6,629,506 | B2 * | 10/2003 | Park | 108/156 |
| 6,712,010 | B2 * | 3/2004 | Bartz et al. | 108/157.1 |
| 6,820,379 | B1 * | 11/2004 | Krinner et al. | 108/156 |
| 6,925,945 | B2 * | 8/2005 | Babick et al. | 108/157.1 |
| 7,100,781 | B2 * | 9/2006 | Craft | 108/156 |
| 2009/0139151 | A1 * | 6/2009 | Quam et al. | 108/158.13 |

* cited by examiner

*Primary Examiner* — Jose V Chen
(74) *Attorney, Agent, or Firm* — Francis C. Hand; Carella, Byrne, et al

(57) ABSTRACT

The leg socket has a plurality of circumferentially spaced apart ribs extending along an interior wall. Each rib has a concavely curved surface extending longitudinally and disposed on a common radius of the wall to provide contact with a cylindrical table leg over a surface.

14 Claims, 6 Drawing Sheets

LEG SOCKET

This application claims the benefit of U.S. Provisional Patent Application 61/626,971, filed Oct. 6, 2011.

This invention relates to a leg socket. More particularly, this invention relates to table leg mounting socket.

Briefly, the invention provides a leg socket for a cylindrical leg of a table having a predetermined diameter.

The leg socket is formed of a hollow shell from which a plurality of circumferentially spaced apart elongated ribs extend along an interior wall of the shell with each rib having a concavely curved surface extending longitudinally thereof and disposed on a common radius of the wall to slidably receive the table leg. In this manner, the ribs of the leg socket contact the table leg over a surface rather than in a point contact manner as described in U.S. Pat. No. 4,793,579. The ribs provide radial contact surfaces with respect to the table leg, thereby, resulting in improved stability in assembly and improved adherence to regulatory standards with respect to the food service industry.

The leg socket is also provided in a conventional manner with a radially outwardly directed flange at an upper end of the wall and a radially inwardly directed lip at an opposite lower end of the wall. Likewise, the leg socket has a threaded bore disposed in the wall between a pair of ribs into which a set screw can be threaded for abutting a table leg to secure the leg socket in place upon assembly.

Each rib of the leg socket is of elongated shape having a pair of parallel side walls, rounded walls at each end and a convexly curved floor extending between the side walls and opposite concavely curved surface.

Typically, the leg socket is cylindrical in cross-section and the ribs are formed by a stamping operation.

Figure 1:
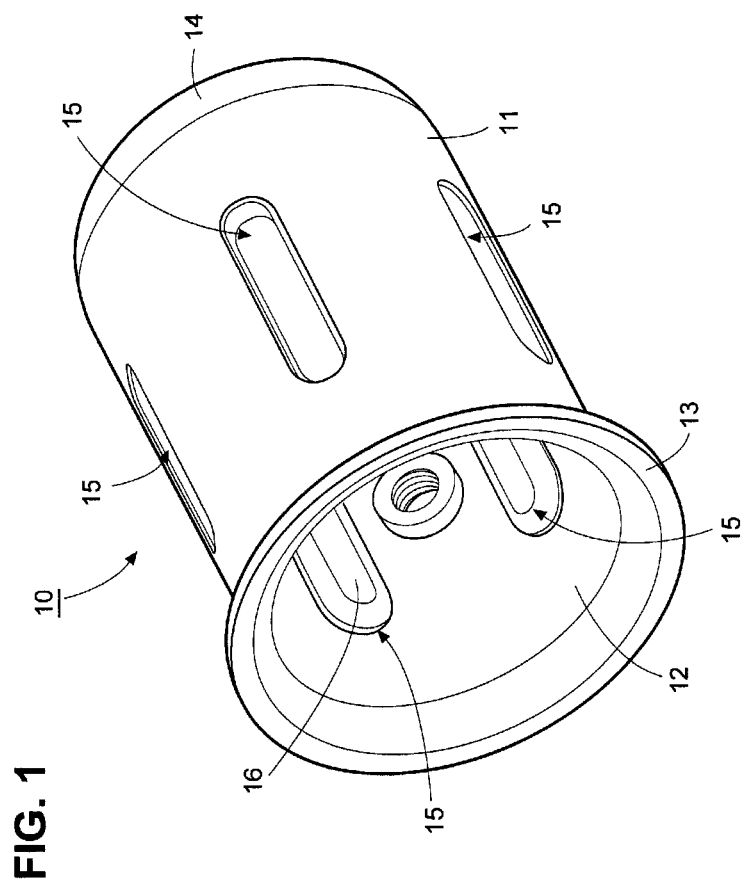
FIG. 1 illustrates a perspective view of a leg socket constructed in accordance with the invention.
Figure 4:
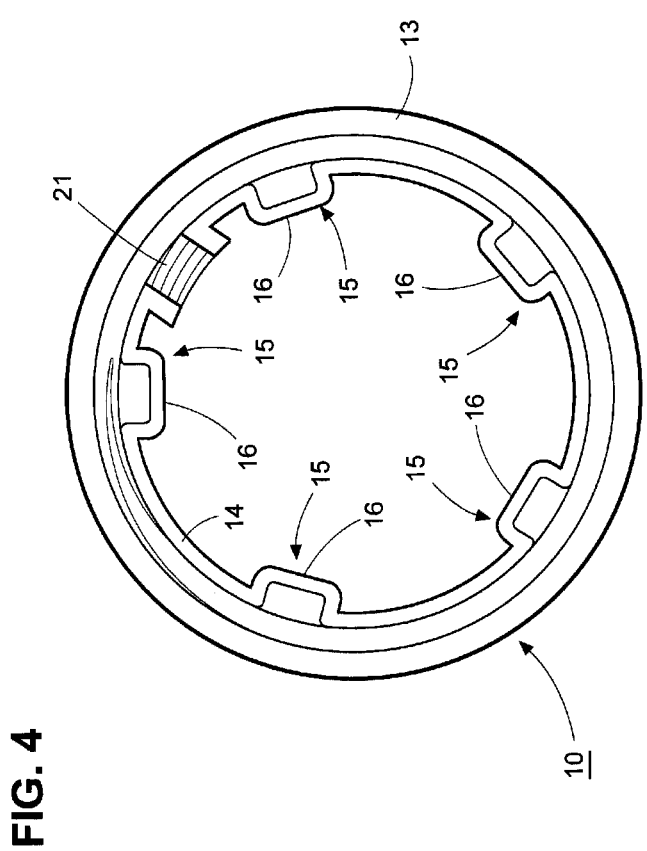
FIG. 4 illustrates an end view of the leg socket of FIG. 1.

Referring to FIGS. 1 and 4, the leg socket 10 comprises a one-piece hollow shell 11 that is formed with an interior cylindrical wall 12, a radially outwardly directed flange 13 at one end of the wall 12 and a radially inwardly directed lip 14 at an opposite end of the wall 12.

In addition, the leg socket 10 has a plurality of circumferentially spaced apart elongated ribs 15 extending along an interior of the wall 12, each of which has a concavely curved surface 16 extending longitudinally thereof and disposed on a common radius of the wall 12.

Figure 2:
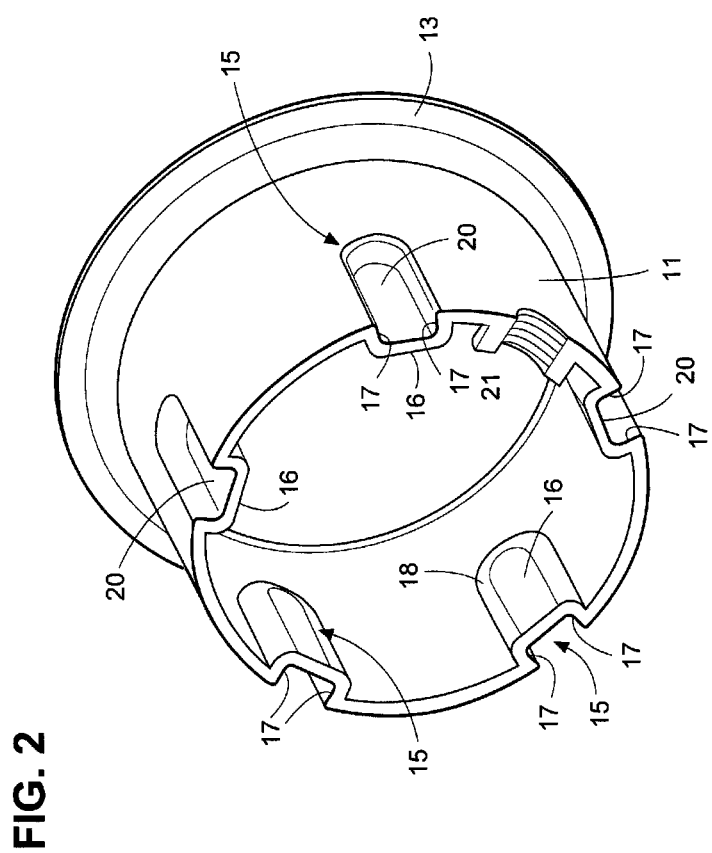
FIG. 2 illustrates a broken perspective view of the leg socket of FIG. 1.
Figure 3:
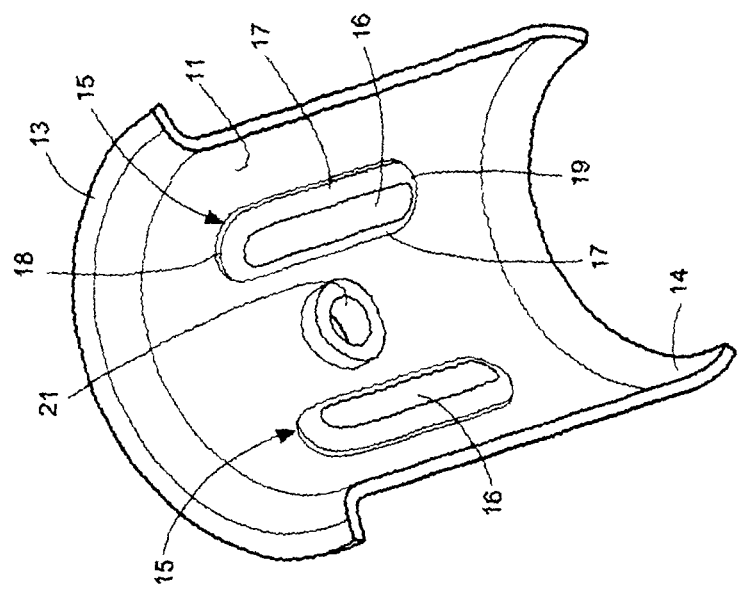
FIG. 3 illustrates a broken perspective view of the interior of the leg socket of FIG. 1.

Referring to FIGS. 2 and 3, the ribs 15 are equi-spaced about the socket 10 and preferably number five, being spaced on an angle of 72° relative to each other.

Each rib 15 is of elongated shape having a pair of parallel side walls 17, a first rounded end wall 18 at one end of the parallel side walls 17, a second rounded end wall 19 at an opposite end of the parallel side walls 17 and a convexly curved floor 20 extending between the side walls 17 and opposite the concavely curved surface 16. Each rib 15 extends along a mid-length of the wall 12 for a length of about one-half the length of the wall 12.

Figure 6:
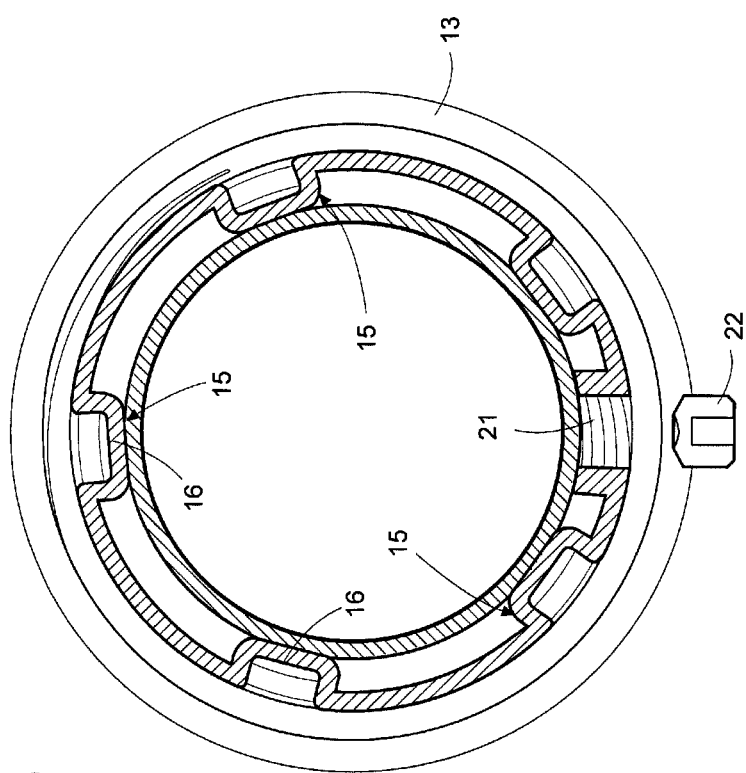
FIG. 6 illustrates a view taken on line 6-6 of FIG. 5.

In addition, the leg socket 10 a threaded bore 21 disposed in the wall 12 between a pair of ribs 15 for receiving a set screw 22 (see FIG. 6).

Figure 5:
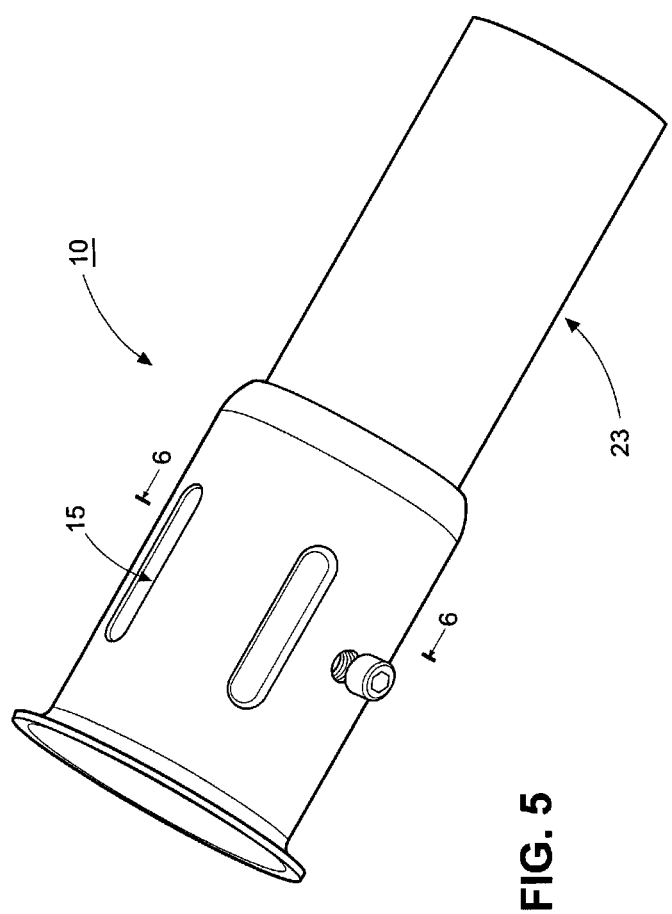
FIG. 5 illustrates a perspective view of the leg socket of FIG. 1 received on a leg of a table in accordance with the invention.

Referring to FIGS. 5 and 6, the leg socket 10 is fabricated to be mounted on the lower end of a cylindrical leg 23 for a table (not shown) having a predetermined diameter, for example a nominal diameter of 1.625 inches. Such table legs are used in the food service industry.

As illustrated in FIG. 6, when assembled on the table leg 23, the ribs 15 of the leg socket 10 receive the leg 23 in a slide fit manner. Each rib 15 contacts the table leg 23 over a surface rather than in a point contact manner.

By way of example, for a table leg 23 of a nominal diameter of 1.625 inches, the leg socket 10 has a thickness of 0.065 inches, a length of approximately 3.062 inches and an outer diameter of 2.00 inches. Each rib has a length of 1.300 inches and a width of 0.25 inches at the outside diameter depth of the stamped rib 15, i.e. on the outside of the socket 10.

The concavely curved surface 16 of each rib is on a common radius so that the surfaces 16 lie on a diameter of 1.630 inches to slidingly receive the table leg 23.

What is claimed is:

1. A leg socket comprising
   a hollow shell including a cylindrical wall, a radially outwardly directed flange at one end of said wall and a radially inwardly directed lip at an opposite end of said wall;
   a plurality of circumferentially spaced apart elongated ribs extending along an interior of said wall and being part thereof, each said rib having a concavely curved surface extending longitudinally thereof and disposed on a common radius of said wall.

2. A leg socket as set forth in claim 1 wherein said ribs are circumferentially spaced on an angle of 72° relative to each other.

3. A leg socket as set forth in claim 1 further comprising a threaded bore disposed in said wall between a pair of said ribs and a set screw threaded into said bore.

4. A leg socket as set forth in claim 1 wherein each said rib is of elongated shape having a pair of parallel side walls, a first rounded end wall at one end of said parallel side walls, a second rounded end wall at an opposite end of said parallel side walls and a floor extending between said side walls and opposite said concavely curved surface.

5. A leg socket as set forth in claim 4 wherein said floor is convexly curved between said side walls.

6. In combination,
   a cylindrical leg for a table having a predetermined diameter; and
   a leg socket receiving said leg, said leg socket having a wall and a plurality of circumferentially spaced apart elongated ribs extending along an interior of said wall and being part thereof, each said rib having a concavely curved surface extending longitudinally thereof and slidably receiving said leg.

7. The combination as set forth in claim 6 wherein said leg socket has a radially outwardly directed flange at one end of said wall and a radially inwardly directed lip at an opposite end of said wall.

8. The combination as set forth in claim 6 wherein said leg socket has a threaded bore disposed in said wall between a pair of said ribs and a set screw threaded into said bore and abutting said leg.

9. The combination as set forth in claim 6 wherein each said rib is of elongated shape having a pair of parallel side walls, a first rounded end wall at one end of said parallel side walls, a second rounded end wall at an opposite end of said parallel side walls and a floor extending between said side walls and opposite said concavely curved surface.

10. The combination as set forth in claim 9 wherein said floor is convexly curved between said side walls.

11. The combination as set forth in claim 6 wherein said leg socket is cylindrical in cross-section.

12. A leg socket comprising
a one piece hollow shell including a cylindrical wall, a radially outwardly directed flange at one end of said wall, a radially inwardly directed lip at an opposite end of said wall, and a plurality of circumferentially spaced apart elongated ribs extending along an interior of said wall, each said rib having a concavely curved surface extending longitudinally thereof and disposed on a common radius of said wall.

13. A leg socket as set forth in claim 12 wherein each said rib is of elongated shape having a pair of parallel side walls, a first rounded end wall at one end of said parallel side walls, a second rounded end wall at an opposite end of said parallel side walls and a floor extending between said side walls and opposite said concavely curved surface.

14. A leg socket as set forth in claim 13 wherein said floor is convexly curved between said side walls.

\* \* \* \* \*